UNITED STATES PATENT OFFICE.

GEORGE CAMPBELL CARSON, OF SAN FRANCISCO, CALIFORNIA.

ART IN THE MANUFACTURING OF IRON.

1,287,221. Specification of Letters Patent. Patented Dec. 10, 1918.

No Drawing. Application filed May 15, 1917. Serial No. 168,682.

*To all whom it may concern:*

Be it known that I, GEORGE CAMPBELL CARSON, a citizen of the United States, residing at 89 Broadway street, in the city and county of San Francisco, State of California, have invented a new and useful Art in the Manufacturing of Iron, of which the following is a specification.

The object of this invention is to manufacture iron by producing carbon for the purpose of reducing metallic iron from iron ores in such localities as for instance as in California where there are large deposits of iron ore so distant from a supply of coke as to render them valueless, and where there is available a large supply of natural gas or petroleum by treating the natural gas or petroleum, to set free carbon contained in them.

I will illustrate one method of procedure assuming that natural gas now being wasted in the oil fields is to be treated to supply carbon for reducing the iron ore.

The gas is led to a combustion chamber and burned with just enough air to combine with the hydrogen of the gas which sets free the remaining carbon as soot which is recovered by depositing it upon large, cool surfaces, or by scrubbing it out of the smoke in a scrubber constructed for that purpose.

Petroleum which is empirically $H_2C$, which is over 85 per cent. carbon and a little over 14 per cent. hydrogen, is vaporized and burned with an insufficient amount of air for the purpose of recovering the carbon just as the gas is treated for that purpose.

The carbon thus recovered is soot being in a very fine state of division and has none of the physical properties of coke, charcoal, or anthracite coal which has always heretofore been used for the purpose of manufacturing iron and cannot be employed as those fuels are used for that purpose.

When there is sufficient sulfur in the soot or carbon recovered from the gas or petroleum to be injurious to the iron produced by them, I remove the sulfur from the carbon by heating it to a dull red heat where the sulfur combines with carbon as carbon bisulfid and escapes from the carbon as vapor.

I prepare the iron ore for reduction by crushing it to a fine state of division and then mixing it with sufficient amount of the soot or carbon recovered from the gas or petroleum treated to reduce the iron therefrom and leave remaining in the reduced iron sufficient carbon to protect the metal from reoxidation.

The iron thus reduced is in a fine pulverulent form and remains to be melted to render it a commercial product. When the reduced iron is to be melted in an open hearth furnace I leave remaining in it only enough of the soot or carbon, to prevent the metal from absorbing oxygen from the furnace gases during melting; but if it is to be melted by a blast of air I leave in the reduced metal a sufficient amount of the soot or carbon to supply the heat for melting. Moreover, the metal is protected from reoxidation.

The reduction of the mixture of crushed iron ore and soot, or carbon, can be carried on in any suitable furnace, kiln or retort, and is best effected at temperatures around a bright red heat. At higher temperatures, iron holds more tenaciously to oxygen and takes up oxygen by reducing $CO_2$ produced in the process to $CO$.

Having thus fully described the application of my discovery what I claim as new and desire to secure by Letters Patent is—

1. The art of manufacturing iron with natural gas, petroleum, or both of them; consisting of dehydrogenizing said gas, petroleum, or both of them, and recovering carbon from them; mixing said carbon with iron ore, heating said mixture to deoxidize said ore, manufacturing said deoxidized ore into metallic iron.

2. The art of manufacturing iron consisting of treating iron ore with carbon produced from natural gas or petroleum, or both of them, said carbon being treated to expel the sulfur contained therein as carbon bisulfid and mixed with prepared iron ore for the purpose of deoxidizing said ore; manufacturing said deoxidized ore into useful iron.

GEORGE CAMPBELL CARSON.

Witnesses:
 B. A. SIMMONDS,
 FLORA HALL.